(12) United States Patent
Wesselink et al.

(10) Patent No.: US 6,585,428 B1
(45) Date of Patent: Jul. 1, 2003

(54) TEMPORARY SURVEILLANCE SYSTEM

(76) Inventors: Richard H. Wesselink, 30641 Hunt Club Dr., San Juan Capistrano, CA (US) 92675; Paul J. Wesselink, 17827 Beach Blvd., Huntington Beach, CA (US) 92647; Stephen Fredrick Brown, 507 Pecan St., Huntington Beach, CA (US) 92648

( * ) Notice: Subject to any disclaimer, the term of this patent is extended or adjusted under 35 U.S.C. 154(b) by 0 days.

(21) Appl. No.: 09/958,706
(22) PCT Filed: Feb. 12, 2001
(86) PCT No.: PCT/US01/04533
§ 371 (c)(1),
(2), (4) Date: Feb. 7, 2002
(87) PCT Pub. No.: WO01/59517
PCT Pub. Date: Aug. 16, 2001

Related U.S. Application Data

(63) Continuation-in-part of application No. 09/502,028, filed on Feb. 10, 2000.

(51) Int. Cl.[7] .............................................. G03B 17/00
(52) U.S. Cl. ..................... 396/427; 396/428; 352/132; 352/243; 348/143; 348/159; 348/373
(58) Field of Search ................................. 396/419, 427, 396/428; 348/143, 144, 149, 151, 153, 158, 159, 373, 148; 352/132, 243; 248/177.1, 178.1

(56) References Cited

U.S. PATENT DOCUMENTS

| 4,374,592 | A | * | 2/1983 | Geary et al. ............. 280/43.13 |
| 4,474,439 | A | * | 10/1984 | Brown ........................ 348/373 |
| 4,913,458 | A | * | 4/1990 | Hamilton .................... 212/304 |
| 5,065,249 | A | * | 11/1991 | Horn et al. ................. 348/375 |
| 5,434,614 | A | * | 7/1995 | Dainty ........................ 348/144 |
| 5,786,854 | A | * | 7/1998 | Slade et al. ................. 348/373 |
| 5,790,910 | A | * | 8/1998 | Haskin ..................... 248/181.1 |
| 5,898,381 | A | * | 4/1999 | Gartner et al. ......... 340/815.45 |
| 5,986,576 | A | * | 11/1999 | Armstrong ................ 116/63 P |

* cited by examiner

Primary Examiner—Alan A. Mathews
(74) Attorney, Agent, or Firm—William G. Lane (57) ABSTRACT

A surveillance system is provided including a platform having a plurality and variety of cameras or sensors mounted thereto, and a base enclosure adapted to accommodate a power supply, a variety of electronics and other equipment for controlling and providing power to the surveillance equipment. The base is constructed to be tamper resistant and immovable by manual means. A substantially hollow support pole includes a lower portion detachably mounted to the base, and an upper portion mounted to the platform. Wires and cables for connecting the surveillance equipment with the electronics and power supply are run through the support pole. Power to the system may be supplied through existing power sources, for example a 120V power source. The system may further be adapted to be trailer mountable for facilitating transport of the system. A trailer assembly specifically adapted for transporting the system may be provided.

11 Claims, 9 Drawing Sheets

TEMPORARY SURVEILLANCE SYSTEM

This is a continuation-in-part of U.S. patent application Ser. No. 09/502,028, filed on Feb. 10, 2000, now pending.

FIELD OF THE INVENTION

The present invention relates to surveillance systems and more specifically relates to a temporary surveillance and security system.

BACKGROUND OF THE INVENTION

Surveillance systems for monitoring remote installations are well known, and typically include on-site surveillance equipment, such as video cameras, microphones, infrared sensors and the like, positioned at various locations, to capture electronic data and information, as well as visual images of the site. These conventional systems often utilize a central monitor station for receiving and processing the electronic data from multiple remote installations. Such surveillance systems require a structure on which the camera or other device may be securely mounted at a desirable elevation. The structure may be a wall of a facility, for example.

On a building construction site, for example a site where an apartment building is under construction, such conventional surveillance systems are less than adequate, as the apartment building itself may be the target of theft or vandalism. The nature of the building under construction lends itself to being climbed by persons intent on vandalism, and the camera used for surveillance can be easily tampered with or destroyed, leaving the construction site virtually unguarded. Theft and arson are not uncommon at such sites, and therefor security guards may be hired to watch the site during off-hours. As can be appreciated, such a solution to vandalism problems is costly and may not be as reliable as an unmanned, mechanical surveillance system.

SUMMARY OF THE INVENTION

The present invention provides a surveillance system which is especially advantageous for temporary use where a conventional surveillance system would be undesirable, such as at a construction site, outdoor concert event, or political rally. The system is transportable to the site in separate portions and then assembled on the site. Once assembled, the system is effectively indestructible, tamper-proof and highly reliable to use. Advantageously, once the system is no longer needed, it can be disassembled and used again in another location.

Accordingly, a temporary surveillance system is provided by the present invention which overcomes the inadequacies of conventional systems. The system is easily assembled at an area to be surveyed. The system is highly versatile for accommodating a number of different applications for example, for daytime and/or evening monitoring of construction sites, outdoor concert events, political rallies, or any other location or event which could benefit from ongoing surveillance.

Importantly, the system is designed to be easily assembled at a site, and effectively tamper-proof once assembled.

The present surveillance system in accordance with the present invention generally comprises a surveillance assembly, including a platform adapted to support surveillance equipment, for example cameras, and a base, including a substantially hollow enclosure adapted to accommodate a power supply and electronics equipment for controlling the surveillance equipment.

The system further includes a support pole, including a lower portion detachably mounted to the base, and an upper portion detachably mounted to the surveillance assembly platform. Applicable wires and cables for connecting the electronics equipment and the surveillance equipment are provided through conduit aligned along or within the support pole. For example, the support pole may be substantially hollow and when disposed through the base may provide an inlet for running wires and cables from the base enclosure through the pole and into the surveillance assembly. The support pole preferably has an inner diameter of a suitable size to accommodate wires and cables and conduit, which may include for example PVC conduit isolating any communication cables from electrical wires/cables. The support pole may be comprised of a unitary structure of up to about 25 feet or more, or may be comprises of a plurality of separate telescoping segments.

The base can comprise a heavy concrete structure weighing, for example, at least about 2500 pounds, sufficient to prevent the base from being manually displaced. The concrete structure may include a steel frame and steel recessed doors resistant to prying or breaking.

The electronics equipment and surveillance equipment may be connected to a power source by hardwiring or quick connect plugs and receptacles. The power source may be an existing 120V or 220V commercial power source. Preferably, the surveillance assembly further includes a power distribution box, mounted in a water tight enclosure to the upper portion of the support pole, the power distribution box being adapted to receive and distribute electrical power from the power source to the surveillance equipment.

In a preferred embodiment, a circuit box including a receptacle for connecting to an existing power supply is provided and is housed within the enclosure. The circuit box preferably includes a plurality of receptacles for accommodating equipment plugs. A power supply may be included within the base enclosure for providing electrical power to the electronic equipment. If power supply is provided, it is preferably enclosed within the concrete base enclosure. The power supply may be electrically connected to an existing power source through wires disposed through the center of the base. Batteries, generators, solar collectors or other suitable means for providing alternative sources of power may also be provided. These alternative power sources may be enclosed within the base enclosure or may be attached to the platform.

The system may further comprise vent means for facilitating passage of air through the system in order to cool the electronic equipment enclosed in the base. For example, the vent means may include an air inlet within the upper portion of the support pole and a fan within the base enclosure, for drawing ambient, cool air though the air inlet through the pole and into the enclosure and for forcing relatively warmer air out of the base enclosure.

The surveillance equipment may comprise many different pieces of equipment, depending on the application desired. The surveillance equipment may comprise a plurality of cameras, for example video cameras, time lapse, digital, still photography cameras, and/or infrared sensors. The platform may be sized and adapted to support any number of cameras or sensors, between one and up to about 250 pieces of equipment. The surveillance equipment may comprise a multiplexor, which may be a four camera multiplexor, an 8 camera multiplexor or a 16 camera multiplexor. The surveillance equipment may be permanently secured to the platform or may be removable. Other surveillance equipment may be alternatively or additionally be provided, for example, pan and tilt devices, satellite transmission devices, and cell phone applications.

In an alternate embodiment, of the present invention, the base can comprise a heavy, solid concrete block, a heavy metal plate structure, a metal or plastic reinforced tank capable of holding water and/or sand, or a reinforced frame with a bladder capable of holding water and/or sand. Such bases have means for permanently or detachably securing the pole. A secured metal container or box for holding, protecting and securing the power supply and electronic equipment for the surveillance equipment can be permanently or detachably secured to the pole and/or the base.

In one advantageous embodiment of the present invention, the surveillance system further comprises means for facilitating transport of the system by vehicle. More particularly, the system includes a trailer that is both sized and adapted to support and accommodate the concrete base. For example, the trailer may be a wheeled trailer comprising a saddle having a floor portion, and at least three sidewalls. The trailer is sized to cradle the base, and includes means, for example a hitch, for enabling the trailer to be towed by a motor vehicle.

Preferably, the trailer includes means for facilitating loading and unloading of the base from the trailer. For example, a rotatable gate may be provided, which would both function to secure the base in the trailer during transport and, upon downward rotation of the gate, as a sturdy ramp element. It will be appreciated that such a trailer preferably may include, or be adapted to include appropriate signal, stop and brake lights and any other equipment and/or necessary features for ensuring legal travel along public roadways.

Moreover, with the trailer feature, the entire surveillance system may be transported substantially intact. For example, a lower portion of the support pole may be permanently mounted to the base, thereby further reducing any chance of vandalism or theft of the pole mounted cameras or other equipment. As described briefly hereinabove, the pole may be comprised of a telescoping configuration, or may include detachable segments. One feature of the invention includes a fixed length support pole, which may be irremovably mounted to the base. Means for enabling an upper portion of the pole to be rotated with respect to the fixed, base-mounted lower portion are provided. Thus, during travel, the base is cradled in an upright position in the trailer, and the upper portion of the support pole is rotated, for example, toward a rear of the trailer, thereby reducing the effective vehicle height. Preferably, a support bar is provided for stabilizing the upper pole portion during travel. In addition still, a trailer mounted winch mechanism may be provided for facilitate raising and lowering of the upper portion of the support pole and for stabilizing the base during loading and unloading from the trailer.

BRIEF DESCRIPTION OF THE DRAWINGS

The features and advantages of the present invention will be more clearly understood and appreciated with reference to the following detailed description when considered in conjunction with the accompanying drawings of which.

DETAILED DESCRIPTION OF THE PREFERRED EMBODIMENTS

Figure 1:
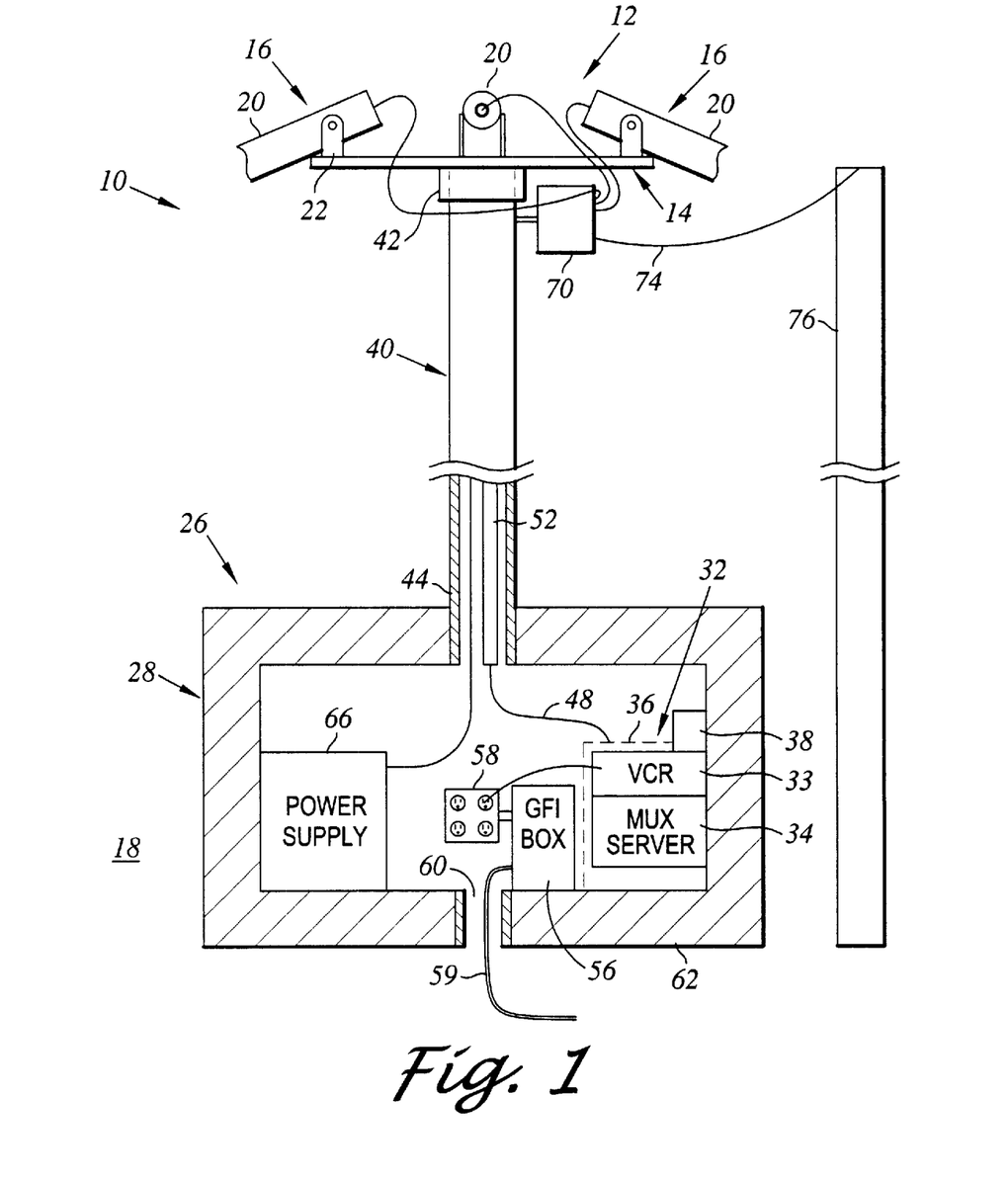
FIG. 1 shows a diagram of an embodiment of a surveillance system in accordance with the present invention, including a heavy, immovable concrete base adapted to contain electronics equipment and a power supply, a support pole, a platform supporting a plurality of surveillance cameras and other surveillance equipment, and cables and wires running at least partially through the support pole to provide electrical and communications connection between the electronics equipment and power supply and the surveillance equipment.

Turning now to FIG. 1, a surveillance system in accordance with the present invention is shown generally at 10. The system generally comprises a surveillance assembly 12, including a platform 14 adapted to support surveillance equipment 16 for providing observations of an area 18 in a vicinity of the surveillance system 10.

The surveillance equipment 16 may include any number and type of device 16 suitable for providing observations of objects. For the sake of simplicity, the surveillance devices 16 shown in FIG. 1 include a plurality of video cameras 20, though it is to be appreciated that the devices may alternatively or additionally include, for example, time lapse, digital, still photography cameras, and/or infrared sensors. The platform 14 may be sized and adapted to support any number of such cameras or sensors, for example between one and up to about 250 pieces of equipment. Furthermore, the surveillance equipment 16 may comprise a multiplexor, which may be a four camera multiplexor, an 8 camera multiplexor or a 16 camera multiplexor, as are known in the art. In addition, it is contemplated that the surveillance assembly 12 may include equipment such as lights, satellite transmission devices, and equipment enabling cell phone applications.

The cameras 20 are shown as secured to the platform 14 by pivotal connectors 22 and the viewing direction and/or angle of the cameras 20 may be controlled by pan and tilt devices (not shown). The platform 14 itself may be a substantially planar element made of steel or other suitable material or materials of construction.

The system 10 further comprises a base 26, including a substantially hollow enclosure 28 sized and adapted to contain equipment, for example electronics equipment 32 for controlling the surveillance equipment 16, for example a video cassette recorder unit 33, and a multiplexor server unit 34. The electronics equipment 32 may be housed within a sub-enclosure 36 made of, for example, plastic, metal, fiberglass or other suitable materials. This sub-enclosure 36 may be equipped with a cooling fan 38, blower or other apparatus to maintain a suitable temperature for effective operation of the equipment 32.

The base 26 can be made of concrete and has a weight sufficient to prevent the base 26 from being displaced by hand. The base 26 may have outer dimensions of, for example, 4'×4'×3', and inner enclosure dimensions of 1'×2'×4'. In addition, the base may have a weight of between about 1000 pounds and about 5000 pounds, conveniently between 2500 and 3000 pounds. The base 26 is constructed to be substantially impact resistant as well, for example with respect to collision by a motor vehicle such as an automobile. Although not shown, the base 26 may include additional concrete block structures, bolted or otherwise secured to the sides of the base 26, to provide additional weight thereto as additional security against theft or tampering.

As shown, the system 10 further comprises a support pole 40 having an upper portion 42 mounted to the surveillance assembly 12 and a lower portion 44 detachably mounted to the base 26, for example at a top center of the base 26. The pole 40 may be about 25 feet high or more and may be comprised of a single pole structure or may be comprised of multiple telescoping portions (not shown). The height of the pole desired may depend on the elevation of which the surveillance equipment will be best suited for observing a desired range of the site. The pole 40 may be made of steel and preferably includes a smooth surface finish for preventing climbing thereof.

In addition, means, such as suitable wiring and cables 48 are provided for connecting the surveillance equipment 16 on the platform 14 to the electronics equipment 32 contained in the base 26.

In a preferred embodiment, the support pole 40 is substantially hollow and is adapted to accommodate the wires 46 and cables 48 used to functionally connect the electronics 32 with the surveillance equipment 16. Preferably, separate means are provided for connecting communications cables 48 with the surveillance assembly 12, for example the communications cables 48 may be run through PVC pipe 52 or other conduit suitable for effectively separating and shielding communications cables 48 from any electrical field. Alternatively, cables, wires and conduit may be secured to an outer surface of the pole 36.

In one particularly advantageous embodiment of the invention, the base 28 also houses a ground fault breaker (G.F.I.) box 56 electrically connected to receptacle means which may include for example an electrical box 58 having four or more standard plug receptacles as shown for connecting to the electronics equipment 32. The G.F.I. box is connected to an incoming power source of 110 volts or 120 volts or to a higher voltage source. As shown, for security reasons, the G.F.I. box may be powered by a line 59 running through an aperture 60 in a bottom portion or slab 62 of the base enclosure 28. The aperture 60 may be more specifically a portion of PVC conduit having a diameter of about 3 inches centered in the concrete base bottom 62. It should be appreciated that electrical power may alternatively be supplied to the G.F.I. breaker box by other standard means, for example by power sources available through power poles at construction job sites, or by means such as batteries, generators, solar collectors or the like. Battery power can be converted through converters, indenters, or other suitable means.

Preferably, electrical power is provided to the surveillance equipment 16, through a separate power supply 66, for example an uninterruptible power supply (UPS) mounted within the base enclosure 28. The power supply 66 may comprise a single power supply unit for each surveillance device 16 or may be a larger power unit for supplying power to multiple devices 16. The power supply 66 may be mounted within the enclosure 28 by for example first mounting the power supply 66 to a (plywood) board by bolts which are bolted to the enclosure 28 by nuts poured in place while the concrete base is poured during construction of the base 26.

A distribution box 70, preferably mounted to the upper portion 42 of the pole 40, is provided for distributing electrical power from the power supply 66 to the various surveillance devices 16. Preferably, the distribution box 70 is water tight and weather resistant.

As shown in FIG. 1, the distribution box 70 may alternatively be connected by line 74 to an existing power/utility pole 76 having a 110V or 120V power supply source. It is contemplated that communications devices, such as telephone devices, in the surveillance assembly may further be connected through communications cables provided by such utility poles.

It is to be appreciated that there are many alternative means for functionally and electrically connecting the surveillance equipment 16 with the electronics equipment 32 and many alternative means for electrically powering these devices, as will be known to those skilled in the art. All such alternative means are considered to be within the scope of the present invention.

Figure 2:
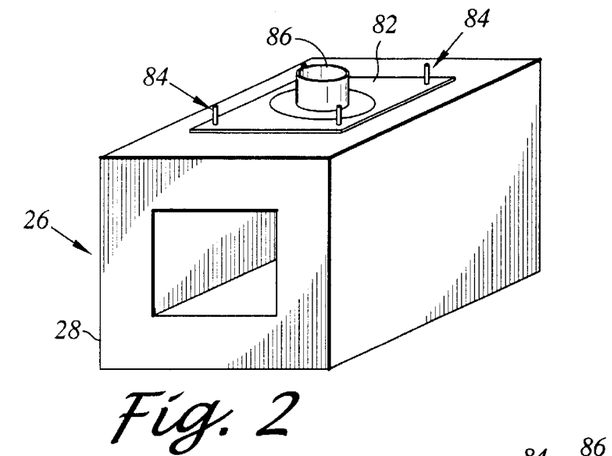
FIG. 2 shows a perspective view of the base shown in FIG. 1 comprising a substantially hollow enclosure for containing the electronics equipment, and a mounting bracket for enabling the support pole to be detachably mounted to the base.
Figure 3:
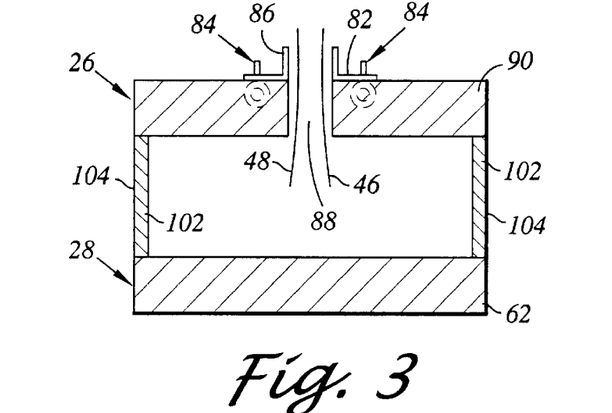
FIGS. 3 and 4 show a side view and a front view, respectively, of the base enclosure shown in FIG. 2.
Figure 4:
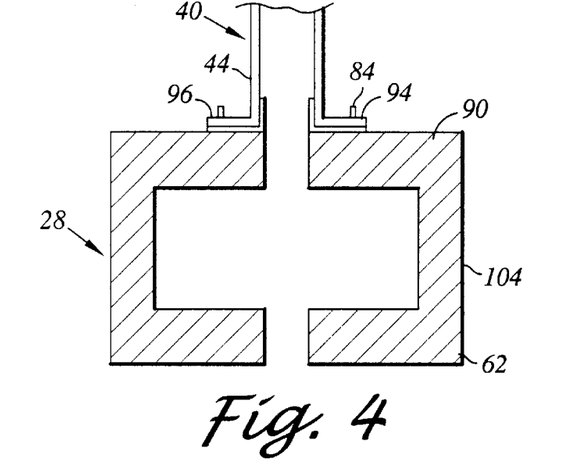

Turning now to FIGS. 2, 3 and 4, an example of suitable means for attaching the pole 40 to the concrete base 26 is shown. FIG. 2 shows the base 26 as including a steel mounting bracket 82 (for example, 24"×24"×3/16" thick) having anchor bolts 84 projecting therefrom, and a sleeve 86 welded thereto for receiving the support pole 40. As shown in FIG. 3, the base enclosure 28 includes an aperture 88 defined in a top wall 90 thereof aligned with the sleeve 86. The mounting bracket 82 is preferably secured into the concrete during the pouring stage. Turning now to FIG. 4, the support pole 40 includes a complementary base plate 94 (for example, 8"×8"×5/8" thick), with apertures 96 for receiving the anchor bolts 84. The necessary cables/wires 46, 48 and PVC conduit (not shown in FIG. 3) have preferably been run through and are disposed within the pole 40 prior to connecting the pole 40 to the base 26. It is noted that alternatively, a support pole 40 may be provided without a base plate 94 and thus the lower portion 44 of the support pole 40 may actually be slidably engaged with the base enclosure 28 by being slipped into the top wall aperture 88 and allowed to contact the bottom slab 62 of the base 26, or may be prevented from contacting the bottom slab 62 by suitable weldings (not shown) on the pole limiting the distance the pole 40 will slip into the base enclosure 28.

Importantly, the system is constructed, so as to be tamper-resistant and indestructible for all reasonable purposes. As mentioned hereinabove, the base 26 itself is a substantially heavy structure. The base 26 also is preferably constructed so that the electronics 32 and other equipment in the enclosure 28 is effectively inaccessible by unauthorized persons. Referring briefly now to FIG. 3, cover plates 102 are provided on open ends 104 of the enclosure 28 for preventing unauthorized entry into the hollow enclosure. Each side portion of the base 26 may include a steel frame (not shown) cemented therein.

Figure 5:
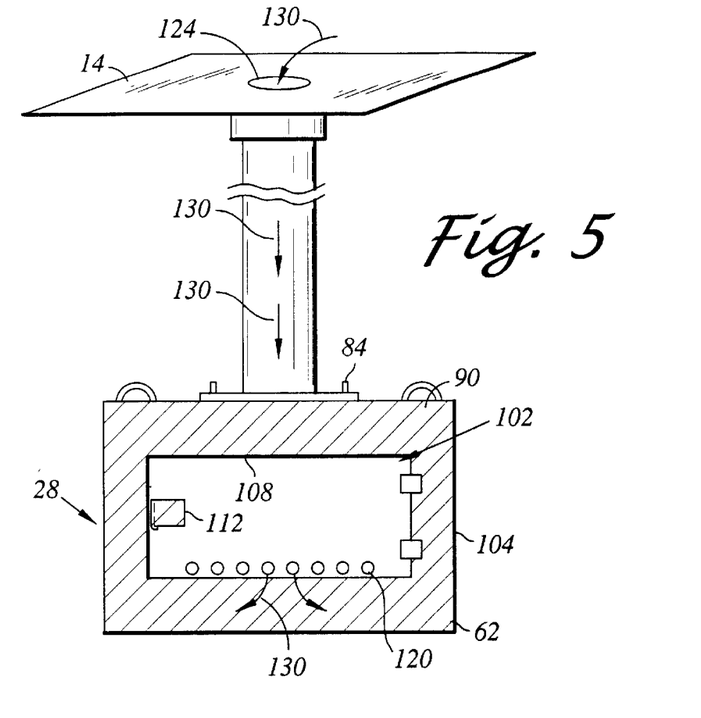
FIG. 5 shows a perspective front view of the base enclosure including a tamper-proof, steel door for enabling access to the equipment in the enclosure.

More specifically, for example, turning now to FIG. 5, the base 26 is shown wherein at least one of the cover plates 102 comprises a lockable door 108 providing means for enabling authorized access to the equipment in the base enclosure 28 while preventing access or tampering by unauthorized persons. The door 108 is "pry-proof" and may include a lock shield 112 enclosing a padlock (not shown). The base 26 may be poured from concrete/cement at the site it is to be used. The support pole and surveillance assembly, including applicable cables and wires within the pole, may be transported from a place of manufacturing thereof, to the site and secured to the base as described hereinabove, by means of trailers and lifting cranes or other suitable machinery. Once assembled, the system is in effect, tamper-proof, and substantially indestructible.

Advantageously, as shown in FIG. 5, the system 10 may further comprise vent means, including for example, vent perforations 120 on the door 108 for facilitating passage of air through the system 10 in order to cool the enclosure 28 and the electronic equipment 32 therein. Preferably, the vent means is adapted to draw ambient air through the upper portion of the support post 40 and into the base enclosure 28. For example, an aperture 124 in the platform 14, or alternatively in the pole 40) may be provided for enabling inflow of cool air into the pole 40 (for example in direction represented by arrows 130) and into the base enclosure 28. As mentioned hereinabove, a mechanical fan or blower (not shown in FIG. 5) may facilitate the cooling process.

Figure 6:
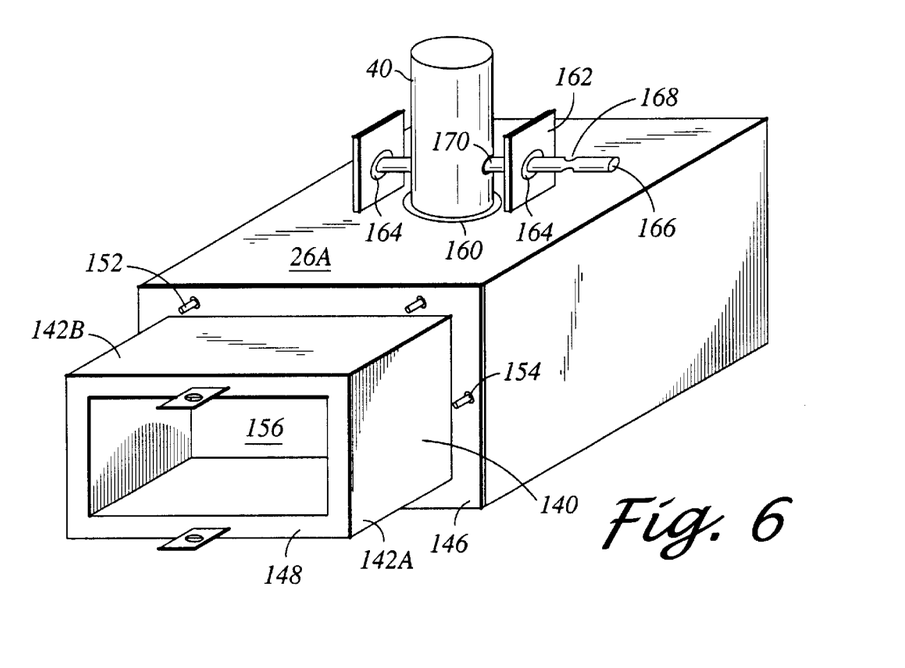
FIG. 6 is a perspective view of an alternative embodiment of the surveillance system.
Figure 7:
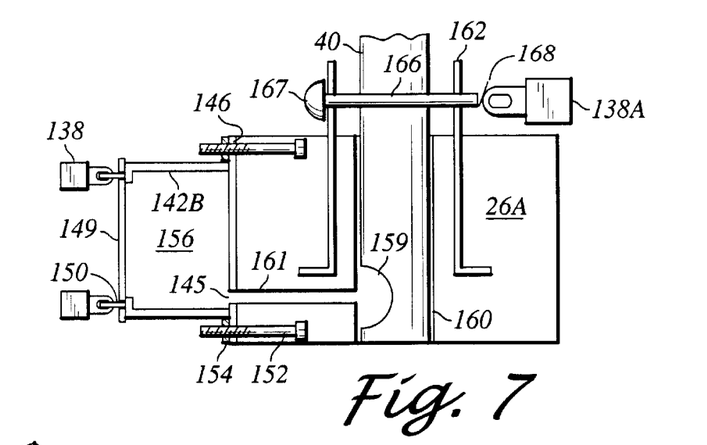
FIG. 7 is a cross-sectional view taken along lines 7—7 of FIG. 6.

Another embodiment of the present invention is illustrated in FIGS. 6 and 7. The base 26A is a solid structure, such as a concrete block having a vertical pole bore 160 extending down from the top for receiving hollow pole 40. An enclosure 140 for electronic equipment and power supply is secured to one side of the base. (The enclosure could also be secured to the top of the base.) The enclosure has side walls 142A, top and bottom walls 142B and back wall 144. Back wall 146 extends outwardly beyond the walls 142A and 142B forming a skirt. The skirt has bolt holes (not shown) to receive anchor studs 152 extending out from the wall at the base. The skirt is secured to the studs with threaded nuts 154, which are welded to the studs, after tightening, to secure the enclosure.

The enclosure has a front frame 148 to receive a front plate 149 to secure the hollow enclosure 156 and the electronic equipment therein (not shown). The front plate receives lock clasps 150 through apertures (not shown) in the front plate. The clasps have holes to receive shackles of locks 138. The hollow enclosure 156 communicates with the hollow pole 40 for wire and cable via hole 145 in the back plate, utility bore 161 in the base 26A, bore 160 and window 159 in the pole.

The pole 40 supporting the surveillance platform 14 is received within bore 160 of the base 26A. A pair of retaining plates 162 secured in the base are located on opposite sides of the bore. The plates have pin apertures 164. The pole has pin holes 170 which are can be aligned with apertures 164. The apertures and holes receive pin 166 which is secured on one end by head 167 and by lock 138A on the other end. The pin has lock shackle hole 168 to receive the lock.

Figures 8, 9:
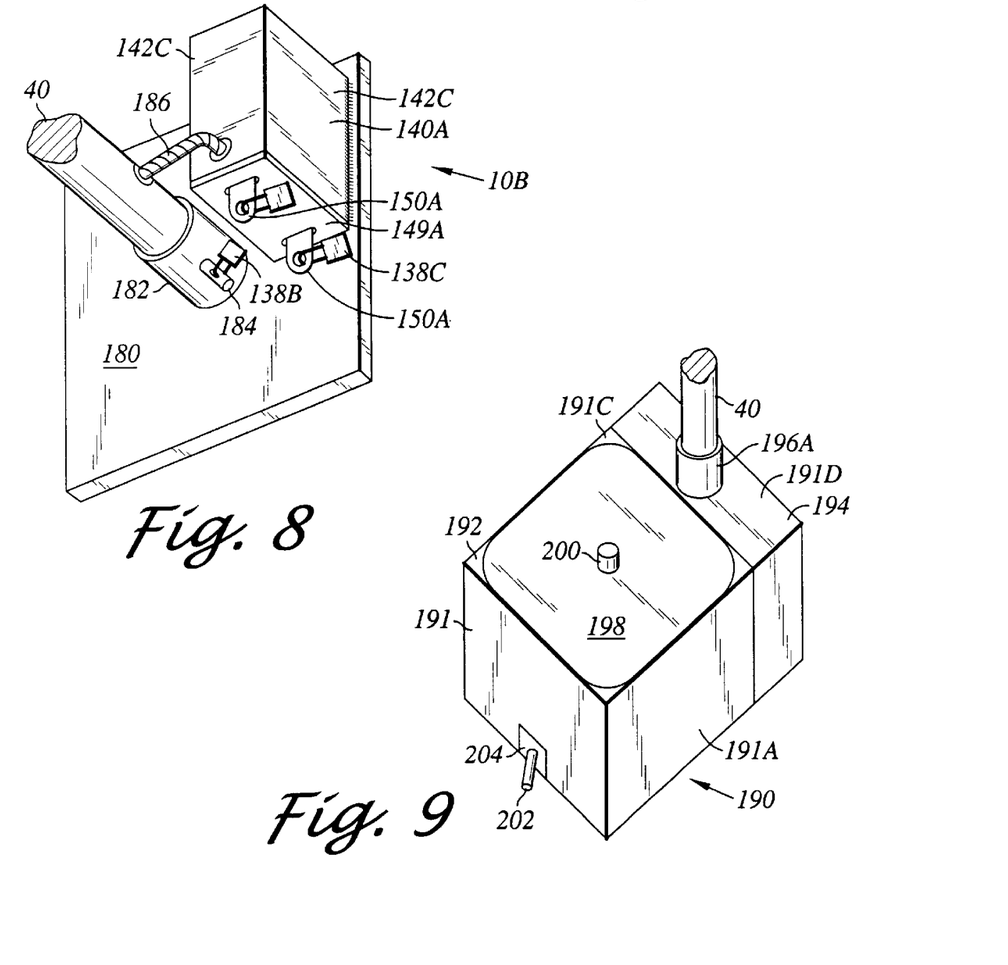
FIG. 8 is a perspective view of another embodiment of the surveillance system of the present invention.
FIG. 9 is a perspective view of still another embodiment of the surveillance system of the present invention.

Another embodiment of the present invention is shown in FIG. 8. The surveillance system 10B has a heavy metal plate base 180. A sleeve 182 is secured to the top of the base. The sleeve receives and secures hollow pole 40 with a pin 184 which is received in holes (not shown) in the wall of the sleeve and the pole. The pin is secured in a manner similar to pin 166 in FIGS. 6 and 7. A secured enclosure 140A for the electronic equipment and power supply is secured to the top of the base. The enclosure has front plate 149A secured by clasps 150A and locks 138C in a manner similar to the front plate 149 of FIGS. 6 and 7 with a lock 138B. The enclosure is in wire and cable communication with the hollow pole 40 by armored conduit 186.

Figure 10:
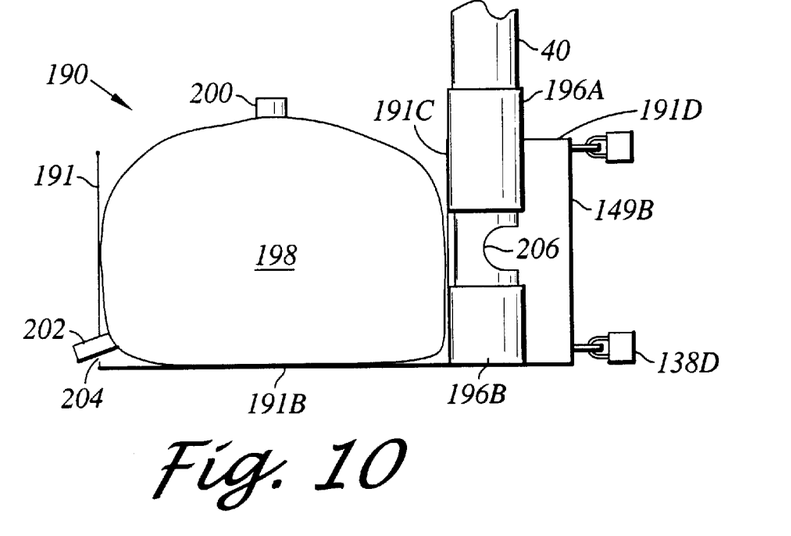
FIG. 10 is a cross-sectional view taken along line 10—10 of FIG. 9.

Referring to FIGS. 9 and 10, the base 190 comprises a housing having end walls 191, side walls 191A, a bottom wall 191B and a subdividing wall 191C within the housing running between side walls 191A and subdividing the housing into an open to compartment 192 and an enclosed compartment 194 having a top wall 191D. The compartment 194 houses the surveillance electronic equipment (not shown) and has a front plate 149B secured by clasps 150A and locks 138D in a manner similar to securing front plate 149A to enclosure 140A in FIG. 8.

The base is fitted with sleeves 196A and 196B to receive and secure the pole 40. Hollow pole 40 has a window 206 to permit communication for cables and wire (not shown) from the equipment and power supplies (not shown) in compartment 194 with the interior of hollow pole 40.

The open top compartment can receive a bladder 198 which can be filled with water via fill spigot 200 to weigh the base down. The bladder is fitted with drain spigot 202 which extends through windows 204 of wall 191 for ease of drainage. The spigots can be lockable to prevent tampering. Alternatively, the open top compartment can be filled with one or more concrete or stone blocks, or with dirt and/or sand to weigh the base down.

Figure 11:
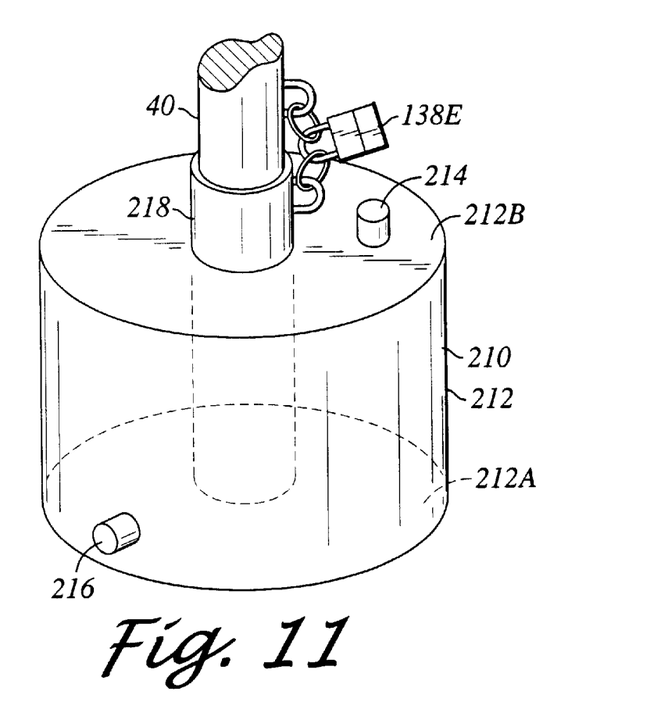
FIG. 11 is a perspective view of a further embodiment of the surveillance system of the present invention.

Referring to FIG. 11, the base 210 comprises a hollow housing having a continuous side wall 212, a bottom wall 212A and a top wall 212B. The base is designed to hold water or other fluid to weigh the base down. A sleeve 218 extends from the top of the base down to the bottom wall 212A. The top wall 212B has a fill spigot 214 and the side wall 212 has drain spigot 216. The sleeve is adapted to receive and secure hollow pole 40. The pole is secured to the base by chains 220A and 220B which are secured to the pole and sleeve and the chains are secured to each other by lock 138E. The top wall 212B or side wall 212 can be fitted with a secure enclosure, similar to the enclosure 140A and 140 of FIGS. 8 and 6, respectively, to hold surveillance electronic equipment and power supplies. The enclosure could communicate with the hollow pole by an armored conduit. Alternatively, a secure enclosure (not shown) can be attached to the pole 40 and communicate with the interior of the pole by holes through the back of the enclosure and the pole.

Figure 12:
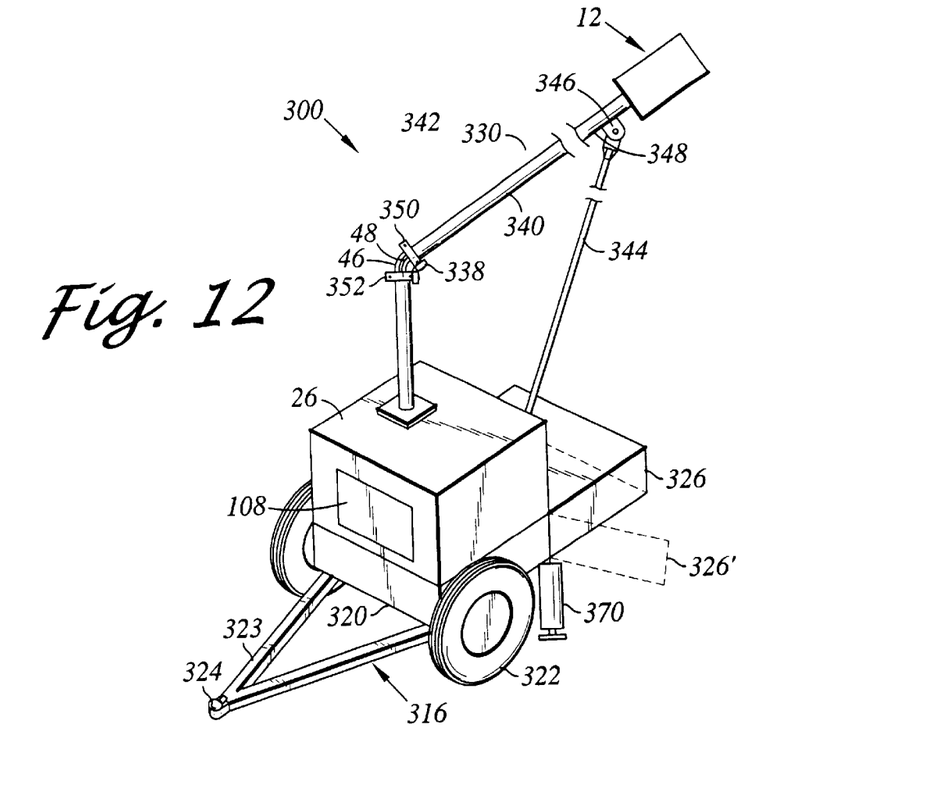
FIG. 12 is a simplified perspective view of another embodiment of the surveillance system of the present invention, including a trailer assembly for facilitating transport of the system.

Turning now to FIG. 12, still another embodiment 300 of the surveillance system of the present invention is shown, the system further comprising means for facilitating transport of the system 300 in a substantially assembled configuration, to and from a surveillance site. Particularly, the base enclosure 26 may be specifically adapted to be easily accommodated on a vehicle trailer, for example a single-axle trailer configured in a conventional manner for towing thereof by a motor vehicle.

Moreover, the system 300 may further comprise such a trailer assembly 316 that is specifically adapted to facilitate transport of the system 300. The trailer assembly 316 may include a cradle portion 320 sized to contain the base enclosure 26 and, mounted in a conventional manner on a single wheeled axle 322. The trailer assembly 316 further includes a tongue 323 and a conventional hitch 324. In the embodiment shown in FIG. 12, the system 300' is adapted for transport on a public roadway with base 26 and support pole 330' connected together and disposed in a substantially upright, vertical position during the transport thereof.

Preferably, the trailer assembly 316 further includes features which provide means for facilitating loading and unloading of the heavy, concrete base 26 to and from the trailer assembly 316. Particularly, the trailer assembly 316 may include a rear access gate 326 which functions as both a security gate during travel and as a ramp element 326' during loading and unloading of the system 300.

In one highly advantageous aspect of the invention, the support pole 330 is height adjustable in order to enable the system 300 to be transported in the upright (or at least substantially upright), vertical position. By transporting the system 300 upright and substantially assembled as shown, the system 300 will be more easily installed at the surveillance site. By transporting the system in the vertical, upright position, the need for lifting or substantial tilting of the heavy base 26 is reduced or eliminated. In addition, the adjustable support pole 330 reduces effective height of the trailer-mounted system 300 during travel on public roadways where height restrictions are common.

For example, the adjustable support pole 330 may comprise telescoping segments (not shown). Preferably, however, the adjustable support pole 330 includes a hinge mechanism 338 adapted to enable rotation of an upper portion 340 of the support pole 330 with respect to a lower portion 342 of the support pole 330 in order to facilitate vehicle transport of the system in an upright position.

In order to provide sufficient stability and support for the upper portion 340 of the pole 330 in the rotated position, a trailer-mounted support bar 344 may be provided. Even more specifically, the pole 330 may include a support tongue 346 and the support bar 344 may include a cooperatively engaging yoke 348.

Upon arrival at a destination, or surveillance site, the base 26 is unloaded from the trailer assembly 316, for example by pulling the base 26 down the ramp element 326' using suitable equipment such as a winch (not shown). Alternatively or additionally, the trailer 316 may be initially lowered to the ground by using a fixed or demountable jacking mechanism 370 to facilitate unloading of the base 26.

It is anticipated that some types of surveillance cameras and other equipment may be sensitive to excessive vibration during travel, and therefor are preferably connected only after arrival at the site. Therefor, after unloading the base 26 from the trailer cradle 320, the desired surveillance apparatus (not shown) is secured and connected to electronic and power cables 46, 48 disposed through the support pole 330. Similarly, the necessary surveillance equipment and power supplies (not shown) may be then installed in the base enclosure 26 using access door 108. At this point, the yoke 348 and tongue 346 may be disengaged from one another and the upper portion 340 of the support pole 330, having surveillance assembly 12 mounted thereon, is rotated forward into a vertical position, facilitated by hinge means 338. Matching flanges 350, 352 on support pole upper and lower portions 340, 342, respectively, are then bolted together using suitable, locking means.

Figure 13:
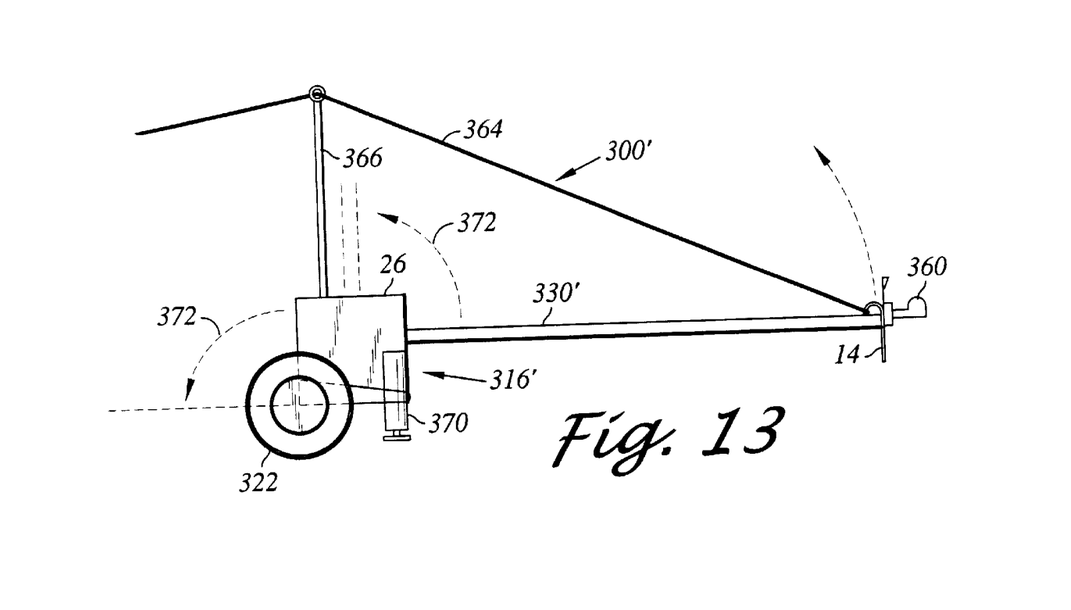
FIG. 13 is a side view of yet another embodiment of the invention, similar to the embodiment shown in FIG. 12.

Turning now to FIG. 13, as an alternative means of transport, the system 300' may be transported by a trailer, such as assembly 316', with the base 26 and support pole 330' in a horizontal position (rather than in the upright position such as shown in FIG. 12). Although other similar arrangements are contemplated and should be considered within the scope of the present invention, in this example, the base 26 rests at about a 90° angle from the upright position within the trailer cradle 320' during transport. The support pole 330' (which may be adjustable length or fixed), is fixed to the base 26, and projects substantially horizontally therefrom, and may function as a trailer tongue for towing. In this case, a fixed or demountable trailer hitch 360 may be detachably mounted on platform as shown. Alternatively still, the trailer means 316' may be adapted to cradle the base 26 in a substantially horizontal position with the support pole projecting rearward away from the towing vehicle (not shown).

Suitable means, such as a winch (not shown), lifting cable 364, and suitably placed cable leverage arm 366 may be provided for safely and controllably hoisting the system 330 into the upright position, as shown by arrows 372, upon arrival at the surveillance site. In addition, a spider outrigger and/or hydraulic, mechanical or electrical jacks, or other means are preferably provided for supporting and stabilizing the system 300' during the lifting process. The cable leverage arm 366 is either fixed to the base enclosure 26 or detachably mounted to the enclosure base.

Advantageously, in the embodiments shown in FIGS. 12 and 13, the surveillance system 300, 300' may be transported to a surveillance site in a substantially assembled configuration, with relatively few assembly steps performed at the site.

With both embodiments shown in FIGS. 12 and 13, it is contemplated that the surveillance system/trailer assembly 300, 300', would include appropriate brakes, brake lights, signal lights and other safety equipment as may be desired or required by highway regulations for transport.

Figure 14:
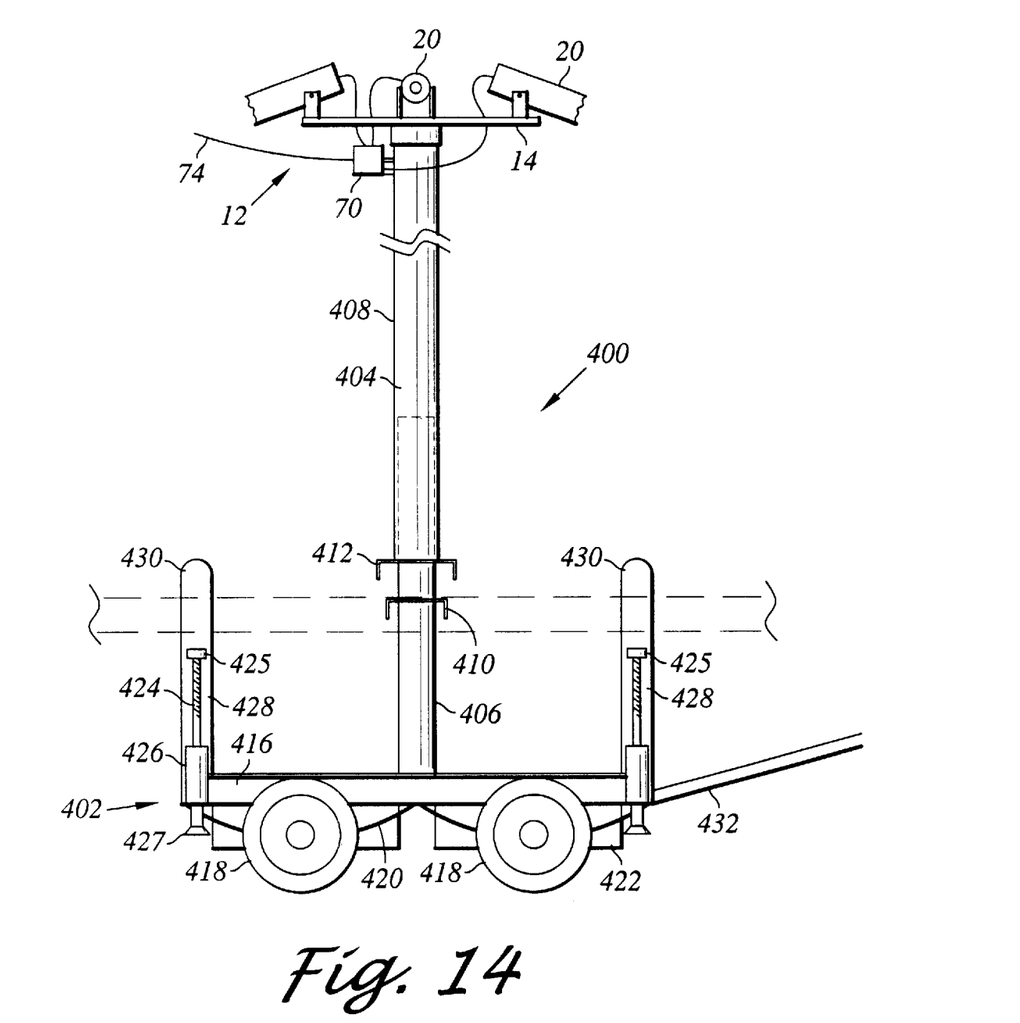
FIG. 14 is a side view of another embodiment of the system of the present invention.
Figure 16:
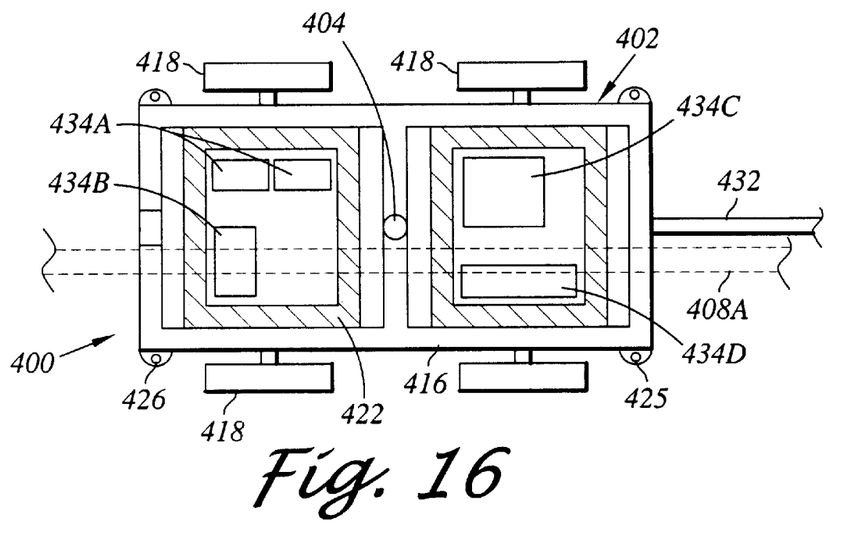
FIG. 16 is a top view of FIG. 14.

Another embodiment of the present invention is a trailer-mounted surveillance system 400 illustrated in FIGS. 14 and 16. The trailer-mounted system 400 comprises a trailer 402 with trailer frame 416 on which is mounted a telescoping pole assembly 404. The electronic surveillance equipment, battery packs, controls and the like for the surveillance system are in secured enclosures 434A through 434D, which are shown in FIG. 16, are mounted on the trailer. Trailer 402 has a frame 416 which is supported by twin wheel assemblies 418 comprising wheels and axles and suspension spring systems 420. The frame is weighted down with ballast 422 which can be cement blocks, tanks filled with sand, gravel, concrete or water. The pole assembly 404 comprises two or more members, a lower pole base member 406 and a pole upper member 408 which is telescopically received on the pole base member 406. Mid way up the pole base member there is secured a base flange 410 and at the bottom of the pole upper member, there is secured an upper flange 412. The flanges limit the penetration of the pole base member 406 into the pole upper member and are used to secure the two members together either with bolts, locks or the like. The two pole members are preferably hollow so that wiring and cabling (not shown) can be run from the surveillance assembly 12 on the platform 14 down through the pole assembly 404 and out a window or aperture (not shown) in the pole base member so that the wire and cabling can go to the appropriate electronic equipment in the secured enclosures 434A through 434D. The wire and cabling in the pole base member to the enclosure are secured in armored conduit or the like. At either end of the trailer, there are supports masts 428 which are mounted off the longitudinal centerline of the trailer. Support forks are attached to the top of the support mast 428 and are adapted to receive the pole upper member when the pole upper member is disassembled from the pole base member during transportation, or during storage, or the like. During transportation or storage, the pole upper member can be secured in the support forks with cable or chain and lock, or with pins and lock.

On the four corners of the trailer frame 416, there are secured support jacks which are lowered into position to lift the trailer and support most of its weight when the trailer has been moved to a desired location for use. By actuating the support jacks and lifting the trailer, the trailer is made immovable and stabilizes the trailer from the effects of wind and the like. The support jacks can be screw threaded jacks 424 which ride in threaded supports 426. The top of the threaded screws have a head 425, such as a hex head to receive a wrench to move the screw up or down. The support jacks can have a lock to prevent tampering. The base of each threaded screw has a base 427 adapted to rest on the ground.

At the front of the trailer, there is secured a conventional trailer hitch assembly 432 which can be pivoted up and downwardly like conventional trailer hitch assemblies. At the end of the hitch assembly (not shown), there is mounted a trailer hitch for securing the trailer to a vehicle for movement to and from locations.

In operation, the trailer-mounted surveillance system is utilized in the same manner as the other surveillance systems disclosed herein. A trailer-mounted surveillance systems can be used in situations where the system is to be moved periodically from location to location and/or in situations where it is desired to move the surveillance system quickly onto and on off a site. It is envisioned the trailer-mounted surveillance system will be used for short-term events, such as rock concerts, auto races, sporting events, such as college football games, professional sport games, political rallies, people's marches and the like.

The trailer-mounted assembly will be stored most conveniently with the pole assembly 404 taken down by removing the pole upper member from the pole base member and placing the pole upper member onto the cradle created by masts 428 and support forks 430. Normally, the platform 14 of the attached surveillance assembly 12 will be removed from the top of the pole upper member when the pole assembly is disassembled. During transportation, the pole upper member will be transported in the cradle and the surveillance assembly 12 will be stored in the vehicle pulling the trailer or on the trailer itself. When the trailer has reached the location where it is to be used, the trailer will be positioned, the jack stands will be extended downwardly to lift the trailer off the ground, the pole upper member will be lifted and inserted over the pole base member 406. Before elevating and erecting the pole upper member, the platform 14 and surveillance assembly 12 will be mounted on the top of the pole upper member. Power from the utility system can be conveniently brought to the mobile surveillance system via power line 74 into a distribution box 70 as described herein.

Figure 15:
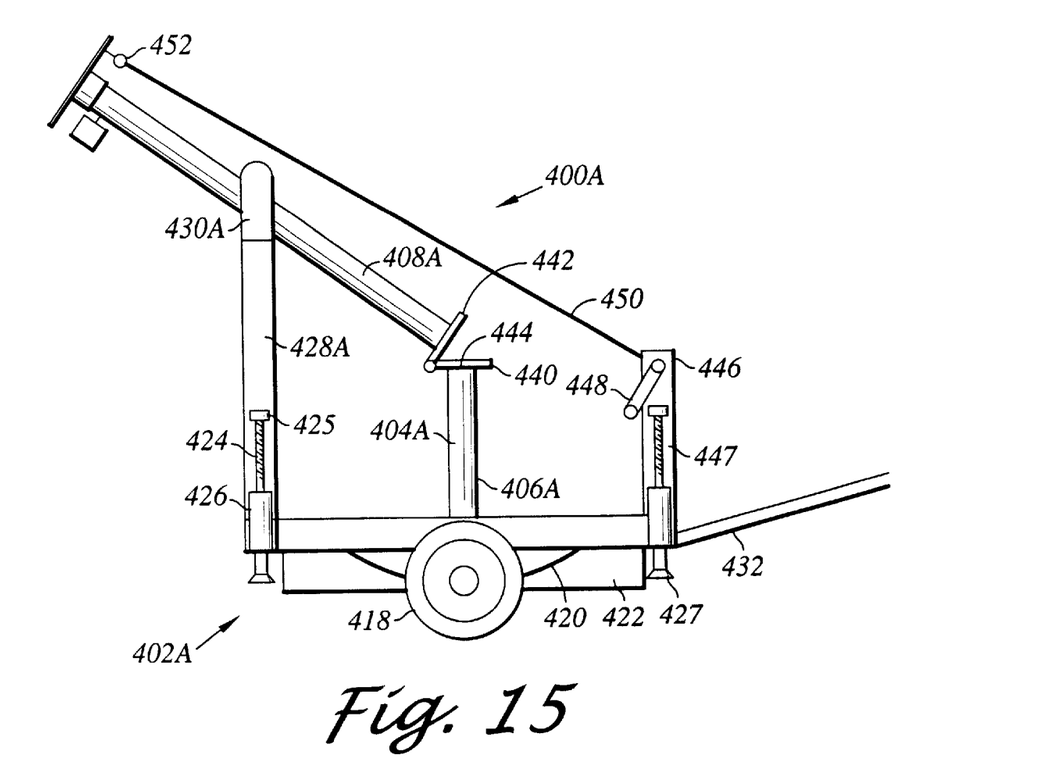
FIG. 15 is a side view of another embodiment of the system of the present invention.
Figure 17:
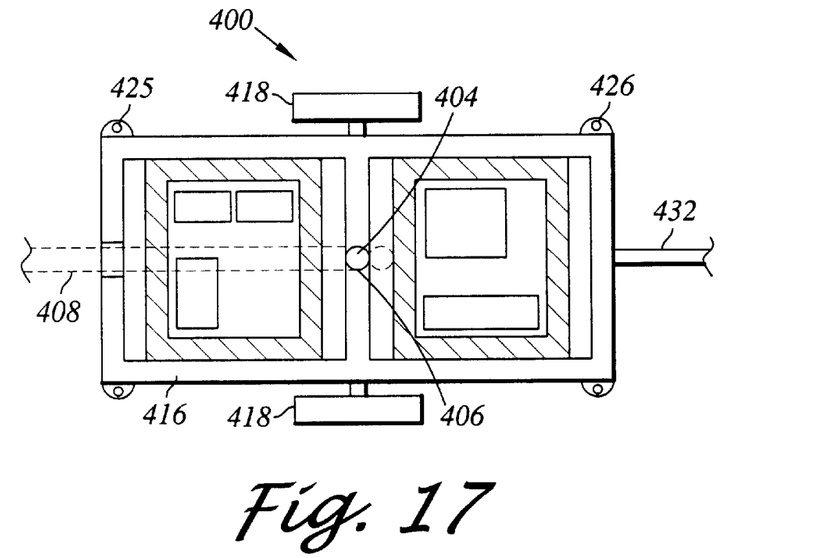
FIG. 17 is top view of FIG. 15.

The mobile surveillance system 400A shown in FIGS. 15 and 27 is very similar to the mobile surveillance system 400 except that in this embodiment, the trailer 402A has single wheel assembly 418. In addition, the pole assembly 404A is a pivoted pole assembly having a pole base member 406A and a pivotable pole upper member 408A attached thereto. A hinge assembly 440 is secured to the pole base member and the pole upper member. The upper base member pivots on the hinge assembly. The hinge assembly has a upper flange 442 and a lower flange 444. When the pole upper member is pivoted upwardly to a vertical direction, the upper flange and bottom flange mate and can be secured together with threaded bolts and nuts and/or locks to secure the pole assembly. To aid in lifting the mast, the mast can be fitted with a windlass system comprising a windlass 446, a windlass handle 448, a cable 450 attached to the windlass drum (not shown) at one end and attached to the upper portion of the pole upper member by cable attachment 452.

During storage and transportation, the pole upper member will be pivoted downwardly so that the trailer mount and surveillance system can travel on the road and clear underpasses, bridges, power and telephone lines, and the like. When the mobile surveillance system is to be used at a location, and the trailer has been placed in the desired location, and the trailer lifted by the jack assemblies, the surveillance assembly 12 (not shown) and platform 14 are mounted on the top of the pole upper member 408A and then the pole upper member is pivoted upwardly on the hinge assembly 440 by winding up the windlass assembly. When the pole upper member is in a vertical direction, the upper flange and bottom flange is secured together as mentioned above with threaded nuts and/or locks. When the mobile surveillance system has completed it operation, the upper flange 442 and lower flange 444 are unsecured and the windlass is let out to permit the pole upper member to pivot downwardly as shown in FIG. 15. The pole upper member is supported in the downward position by mast support 428A and fork support 430A. The pole upper member can be secured in the fork by rope, cable, chain and lug pin.

While this invention has been described with respect to various specific examples and embodiments, it is to be understood that the invention is not limited thereto, and that it can be variously practiced within the scope of the following claims.

What is claimed is:

1. A surveillance system comprising:
    a surveillance assembly, including a platform adapted to support surveillance equipment for providing observations of a surveillance site;
    a base, including a substantially concrete structure defining a enclosure sized to contain electronics equipment for controlling the surveillance equipment, and further including means for preventing access to the enclosure;
    a support pole having an upper portion mounted to the surveillance assembly and a lower portion mounted to the base;
    means for functionally connecting the surveillance equipment to the electronics equipment contained in the base;
    a trailer assembly adapted to facilitate transport of the system to and from the surveillance site; and
    means for facilitating loading and unloading of the base to and from the trailer assembly.

2. The system according to claim 1 wherein the trailer assembly is a single-axle trailer assembly.

3. The system according to claim 1 wherein the trailer assembly includes ramp means for facilitating loading and unloading of the base from the trailer assembly.

4. The system according to claim 1 wherein the support pole includes a hinge mechanism adapted to enable rotation of the upper portion of the support pole with respect to the lower portion of the support pole in order to facilitate vehicle transport of the system in a substantially upright position.

5. The system according to claim 1 wherein the weight of the base is at least about 2500 pounds.

6. The system according to claim 1 wherein the support pole is substantially hollow, and the means for functionally connecting the electronics equipment with the surveillance equipment includes wiring disposed at least partially through the substantially hollow support pole.

7. The system according to claim 1 wherein the support pole comprises a plurality of telescoping segments in order to facilitate vehicle transport of the system in a substantially upright position.

8. The system according to claim 1 wherein the surveillance equipment comprises a multiplexor including a plurality of cameras.

9. The system according to claim 1 wherein the means for functionally connecting the electronics equipment with the surveillance equipment includes PVC conduit adapted to accommodate communications cable through the substantially hollow support pole.

10. A surveillance system comprising:

a surveillance assembly, including a platform adapted to support surveillance equipment for providing observations of a surveillance site;

a base having a weight sufficient to prevent manual displacement thereof, the base including a substantially concrete structure defining a enclosure sized to contain electronics equipment suitable for controlling the surveillance equipment;

means for restricting access to the base enclosure;

an adjustable support pole including an upper portion mounted to the surveillance assembly and a lower portion mounted to the base;

means for functionally connecting the surveillance equipment to the electronics equipment contained in the base;

a trailer assembly adapted to facilitate transport of the system to and from the surveillance site; and means for facilitating loading and unloading of the base to and from the trailer assembly.

11. A surveillance system comprising:

a surveillance assembly, including a platform adapted to support surveillance equipment for providing observations of an area in a vicinity of the surveillance system;

a base, including a substantially hollow enclosure sized and adapted to contain electronics equipment for controlling the surveillance equipment, the base comprises a substantially concrete structure having a weight sufficient to prevent the base from being manually displaced;

a support pole having an upper portion mounted to the surveillance assembly and a lower portion mounted to the base, wherein the base and the support pole are sized and adapted to be supported by and transported on a vehicle trailer;

means for functionally connecting the surveillance equipment to the electronics equipment contained in the base;

a trailer assembly for facilitating transport of the system; and means for facilitating loading and unloading of the base to and from the trailer assembly.

* * * * *